United States Patent [19]

Buehler

[11] Patent Number: 4,809,732

[45] Date of Patent: Mar. 7, 1989

[54] FITTING FOR CLEARING WATER FROM FLUID CONTAINING SYSTEMS

[76] Inventor: Werner G. Buehler, P.O. Box 2378, LHC, Ariz. 86403

[21] Appl. No.: 166,545

[22] Filed: Mar. 10, 1988

[51] Int. Cl.$^4$ .................. A01G 25/00; B05B 1/00
[52] U.S. Cl. .................. 137/209; 137/240; 239/106
[58] Field of Search .............. 137/1, 240, 209; 239/201, 104, 106

[56] References Cited

U.S. PATENT DOCUMENTS

| | | | |
|---|---|---|---|
| 1,492,941 | 5/1924 | Sherman | 239/201 X |
| 2,259,644 | 10/1941 | Kling | 141/1 |
| 2,326,687 | 8/1943 | Sanford | 303/88 |
| 3,845,779 | 11/1974 | Greene | 137/209 |
| 4,026,318 | 5/1977 | Lejeune | 137/223 |
| 4,246,926 | 1/1981 | Morello | 137/209 |
| 4,346,726 | 8/1982 | Bayen | 137/15 |
| 4,355,652 | 10/1982 | Perkins | 137/15 |
| 4,698,983 | 10/1987 | Hechavarria | 62/292 |

Primary Examiner—Alan Cohan
Attorney, Agent, or Firm—Eugene M. Eckelman

[57] ABSTRACT

A body member has a top opening recess and a depending stem having an external portion capable of removable engagement in one of the outlets of a fluid containing system of the type having a plurality of outlets, such as an underground lawn sprinkling system. The top opening recess has an integral valve stem therein which is in communication with a bore extending upwardly through the bottom of the stem. By connecting the body member into one of the outlets and connecting the valve stem to a source of air pressure, the system can be cleared of water through one or more of its other outlets.

1 Claim, 1 Drawing Sheet

FITTING FOR CLEARING WATER FROM FLUID CONTAINING SYSTEMS

BACKGROUND OF THE INVENTION

This invention relates to a new and useful fitting for use in clearing water from fluid containing systems.

One type of fluid containing system comprises underground sprinkler systems designed for the convenient watering of lawns, gardens, and the like. In areas that are subjected to freezing weather, such systems must be drained to prevent damage to the pipes, valves, fittings, and other parts. These systems generally have drain means intended to remove the water but such drain means depend on gravity for this purpose. In the event that the system is not properly laid out for gravity drain or the drain becomes plugged, and such are common occurrences, extensive damage is capable of being done to the system during freezing weather.

SUMMARY OF THE INVENTION

According to the present invention and forming a primary objective thereof, a fitting is provided which is arranged removably to be installed in place of one of the sprinkler heads of a sprinkler system and which is capable of attachment thereto of conventional air pressure supply means whereby water can be pumped from the system to provide efficient purging of residual water.

Another object resides in the process of clearing water from an underground sprinkler system utilizing the subject fitting, namely, removing a sprinkler head in the system from its threaded outlet, threadedly substituting a fitting capable of connection to conventional air pressure supply means, then connecting this fitting to said conventional source of air pressure, and then supplying pressured air to the sprinkler system for clearing water from the system.

In carrying out the objectives of the invention, the fitting of the invention has a body member with a valve stem mounted thereon. It also has a depending stem with an upright bore extending therethrough. The stem has external threads capable of removable threaded engagement with threaded portions of an outlet from which a sprinkler head has been temporarily removed whereby water can be cleared from the system by connecting conventional air pressure supply means to the valve stem and supplying pressured air to the system.

The invention will be better understood and additional objects and advantages will become apparent from the following description taken in connection with the accompanying drawings.

DETAILED DESCRIPTION OF A PREFERRED EMBODIMENT

Figure 1:
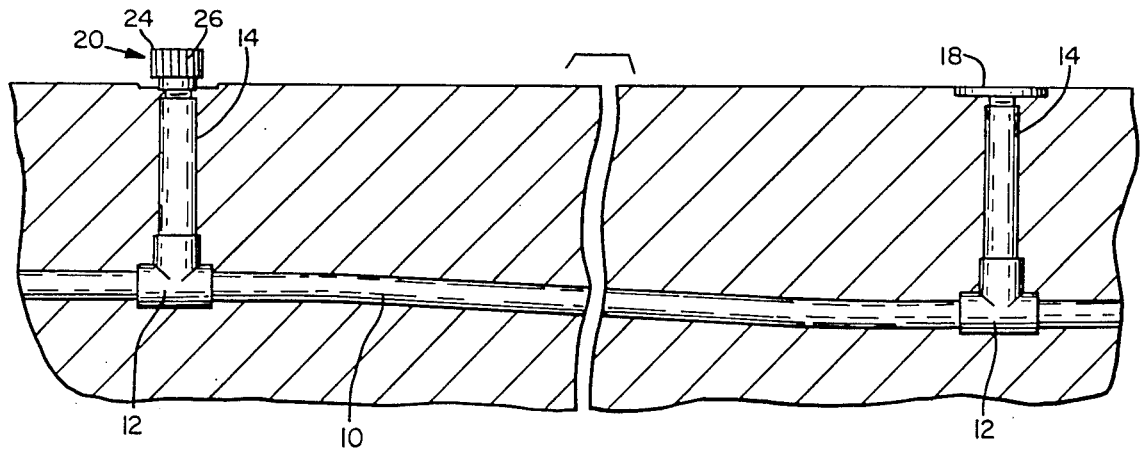
FIG. 1 is a fragmentary underground sectional view showing a sprinkler system to which the present invention may be applied.
Figure 3:
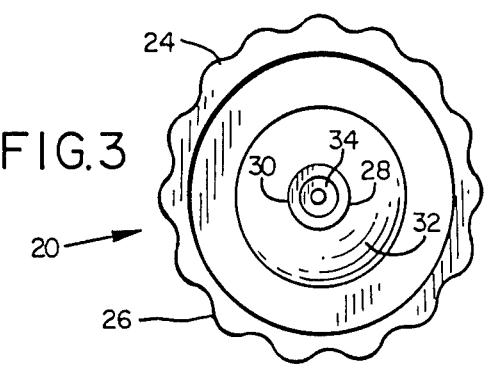
FIG. 3 is a top plan view thereof.
Figure 2:
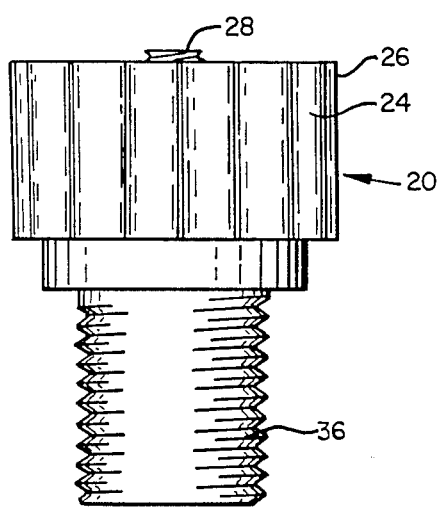
FIG. 2 is an elevational view of the fitting of the invention.
Figure 4:
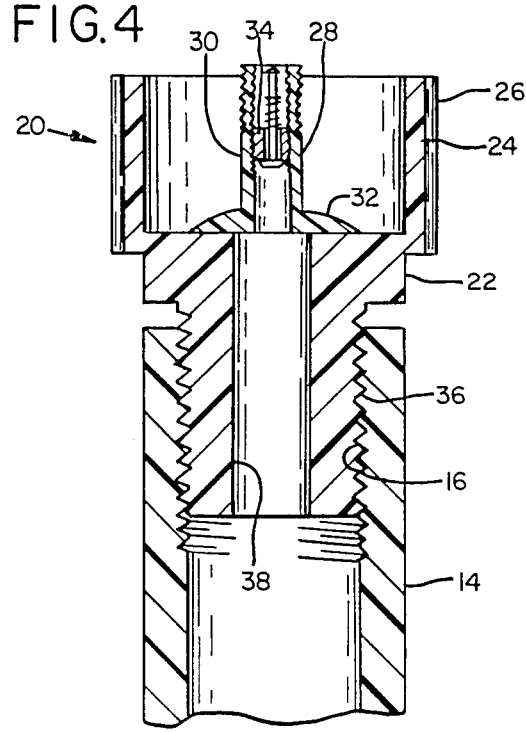
FIG. 4 is a sectional view of the fitting installed in a sprinkler line outlet for functional use.

With particular reference to the drawings and first to FIG. 1, the numeral 10 designates an underground line or pipe of a conventional type arranged for installation in lawns, gardens or the like. As customary, the system employs a plurality of tees 12 on which stand pipes 14 or the like, also seen in FIG. 4, are mounted and which in turn have an upper internal threaded portion 16 removably supporting sprinkler head assemblies 18 thereon. The line 10 is usually inclined for drainage at a low point.

The fitting of the invention is designated generally by the numeral 20, FIGS. 1-4, and comprises a body portion 22 having an upper circular extension 24 as an integral part thereof. The exterior surface of the upper extension 24 has upright beads or other finger grip portions 26 thereon which facilitate manual of the fitting.

The upper extension 24 has a top opening recess therein, and a valve stem 28, such as a valve of the type used in a hand tire pump is mounted in this recess. Such valve stems typically comprise an upright body portion 30, a base portion 32, and a valve core 34.

The present fitting has a depending, externally threaded shank 36, and a bore 38 extends through the body member and such shank. Valve stem 28 is secured within the circular upper extension 26 with its base flat on the top of the body member and communicates for controlled air movement with the bore 38.

For the purpose of clearing water from a sprinkler system, a sprinkler head in the system is threadedly disengaged from the line and the present fitting installed in its place. Preferably, the sprinkler head which is removed is the one at the highest elevation in the system. Thereupon, air pressure supply means is connected to the valve stem 28 and air pressure applied to the system. Such air forces any residual water either out the drain in the system or out other sprinkler heads. The lowest sprinkler head can be removed if desired for the fastest draining of water.

The present invention thus insures that water has been purged from the system to prevent freezing.

The present fitting can be designed for releasable connection into most any type of system that requires drainage. Its most useful purpose, however, is in connection with sprinkler units in lawn and garden watering systems. Also, the valve stem 28 can be designed for connection to any conventional air pressure supply means, but in a preferred structure, it comprises a valve stem capable of connection to a conventional hand tire pump since such an air pressure supply means is always available and capable of ready transportation to the site.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. For use with an underground sprinkler system having a feed line and a plurality of spaced sprinkler outlets on said line with sprinkler heads threadedly and removably mounted in said outlet, a pump fitting having a body member with upper and lower ends, said body member having an upper circular extension with a top opening recess, a valve stem mounted in said recess and having an upper portion terminating adjacent the top opening of said recess and arranged for removable connection to a conventional hand tire pump, and a depending shank on said body member having an upright bore therethrough communicating at its upper end with said valve stem, said depending shank having external threads capable of removable threaded engagement in threaded portions of one of said sprinkler outlets in a sprinkler system from which a sprinkler head has been temporarily removed whereby water can be cleared from the system through other sprinkler outlets by connecting a conventional tire pump to said valve stem and pumping air into the system, said upper circular extension having an exterior surface provided with finger grip means facilitating manual threaded engagement and disengagement of said pump fitting from one of said sprinkler outlets.

* * * * *